(12) United States Patent
Tseng (10) Patent No.: US 8,914,233 B2
(45) Date of Patent: Dec. 16, 2014

(54) METHODS FOR FORECASTING FLIGHT PATHS, AND ASSOCIATED SYSTEMS, DEVICES, AND SOFTWARE

(75) Inventor: Philip Tseng, Portland, OR (US)

(73) Assignee: Appoven, LLC, Portland, OR (US)

( * ) Notice: Subject to any disclaimer, the term of this patent is extended or adjusted under 35 U.S.C. 154(b) by 440 days.

(21) Appl. No.: 12/831,079

(22) Filed: Jul. 6, 2010

(65) Prior Publication Data

US 2012/0010806 A1 Jan. 12, 2012

(51) Int. Cl.
*G01C 21/00* (2006.01)
*H04N 7/18* (2006.01)
*G06Q 50/30* (2012.01)
*H04W 4/02* (2009.01)

(52) U.S. Cl.
CPC ............... *G01C 21/00* (2013.01); *G06Q 50/30* (2013.01); *A63F 2300/406* (2013.01); *H04W 4/02* (2013.01); *A63F 2300/8064* (2013.01)
USPC .......................................... 701/454; 348/116

(58) Field of Classification Search
USPC ......... 701/201, 1, 4, 202, 516, 517, 528, 454; 702/150; 345/173; 348/231.3, 116; 340/903, 973; 463/9
See application file for complete search history.

(56) References Cited

U.S. PATENT DOCUMENTS

| | | | |
|---|---|---|---|
| 4,827,419 A * | 5/1989 | Selby, III | 701/528 |
| 5,067,081 A * | 11/1991 | Person | 701/533 |
| 5,610,822 A | 3/1997 | Murphy | |
| 6,353,794 B1 * | 3/2002 | Davis et al. | 701/517 |
| 6,470,264 B2 * | 10/2002 | Bide | 701/516 |
| 6,661,353 B1 * | 12/2003 | Gopen | 340/973 |
| 6,965,827 B1 * | 11/2005 | Wolfson | 701/454 |
| 7,298,289 B1 * | 11/2007 | Hoffberg | 340/903 |
| 7,650,232 B1 * | 1/2010 | Paielli | 701/528 |
| 7,720,630 B1 * | 5/2010 | Miller et al. | 702/150 |
| 7,852,711 B1 * | 12/2010 | Fitzgerald et al. | 368/21 |
| 2002/0002548 A1 * | 1/2002 | Roundtree | 707/1 |
| 2005/0278753 A1 | 12/2005 | Brady, Jr. et al. | |
| 2006/0259234 A1 * | 11/2006 | Flynn et al. | 701/202 |
| 2008/0165146 A1 * | 7/2008 | Matas | 345/173 |
| 2009/0070841 A1 | 3/2009 | Buga et al. | |
| 2009/0143125 A1 * | 6/2009 | Baudisch et al. | 463/9 |
| 2009/0271109 A1 | 10/2009 | Lee et al. | |
| 2009/0319100 A1 * | 12/2009 | Kale et al. | 701/4 |
| 2010/0060739 A1 | 3/2010 | Salazar | |
| 2010/0063854 A1 | 3/2010 | Purvis et al. | |
| 2011/0080501 A1 * | 4/2011 | Chen | 348/231.3 |

OTHER PUBLICATIONS

FlightView, "FlightView Mobile Content", May 8, 2010, www.flightview.com/corporate/RelatedContent/FV_MobileContent.pdf.*

* cited by examiner

*Primary Examiner* — Calvin Cheung
*Assistant Examiner* — Aaron L Troost
(74) *Attorney, Agent, or Firm* — Dascenzo Intellectual Property Law, P.C.

(57) ABSTRACT

Mobile computing device implemented methods, and associated systems, devices, and software for forecasting flight paths associated with a unique-flight. Methods may include prior to departure of the unique-flight, retrieving from a flight-data-server via the Internet an initial-forecasted-flight-path based on flight-path-data for the unique-flight, and displaying indicia associated with the initial-forecasted-flight-path.

19 Claims, 5 Drawing Sheets

METHODS FOR FORECASTING FLIGHT PATHS, AND ASSOCIATED SYSTEMS, DEVICES, AND SOFTWARE

FIELD OF THE DISCLOSURE

The present disclosure is related to methods for forecasting flight paths, and associated systems, devices, and software.

BACKGROUND OF THE DISCLOSURE

Air travel by individuals or families may be for business or for pleasure. Regardless, air travel may be arduous due to delays in flights, changes in itineraries, lack of entertainment, etc.

SUMMARY OF THE DISCLOSURE

The present disclosure relates to methods for forecasting flight paths, such as may be implemented on a traveler's mobile computing device. Accordingly, a traveler may have an interactive experience tracking his/her flight during the actual flight itself. This interactive experience is based on the forecasting, or predicting, of a flight path associated with the traveler's flight. In some methods according to the present disclosure, a user may be able to input data associated with the status of his/her flight, so that his/her mobile computing device may update, or refine, its forecast of the flight path. Also disclosed are systems, devices, and software associated with the mobile computing device implemented methods.

DETAILED DESCRIPTION AND BEST MODE OF THE DISCLOSURE

The present disclosure relates to forecasting the flight paths of unique-flights. As an illustrative, non-exclusive example, the subject matter of the present disclosure may be implemented so that a traveler may use a mobile computing device to forecast the flight path of an upcoming flight and/or to forecast and track the flight while aboard the flight. That is, a mobile computing device and/or software associated with a mobile computing device may allow for a traveler to have an interactive experience while traveling. This experience may include such things as inputting data to refine a forecast, or prediction, of the flight's path, including a predicted location of the flight at any given time, and viewing information related to the forecasted flight path, such as on a map displayed on the mobile computing device. A traveler may be able to recalibrate a forecasted flight path of the traveler's flight by inputting updated flight data, such as location and times associated with the flight. Additional interactive experiences may include viewing information about landmarks viewable out an aircraft's window during the traveler's flight, playing a game based on identifying landmarks viewable out the aircraft's window, sharing associated information via social networks, etc. These and other interactive experiences are discussed herein and may be described in terms of mobile computing device implemented methods, and/or in terms of associated systems, devices, or software.

As used herein, a unique-flight is a specific flight from an origin to a destination, such as typically is identified by an airline code and a flight number, an alphanumeric code, or other flight identifier code. Typically, a unique-flight is defined by a scheduled departure date, a scheduled departure time, an origin location (such as a city or an airport), a destination location, an airline, carrier, or other service provider, and an aircraft model. A unique-flight may further be defined by a scheduled arrival date and a scheduled arrival time. However, the scheduled dates and times of a unique-flight may not in fact represent actual dates and times, in so far as commercial flights may depart and/or arrive ahead of schedule and/or behind schedule. Also within the scope of unique-flight, as used herein, may be the actual aircraft corresponding to the unique-flight, for example, when discussing the location, speed, elevation, etc. of the unique-flight.

As used herein, a flight path of a unique-flight corresponds to a scheduled, forecasted, or actual flight path that a unique-flight takes from an origin to a destination, and is a function of the location of the unique-flight and time. For example, a flight path may include, define, and/or be defined by such data as departure time, arrival time, and/or duration of the unique-flight, and by coordinates and/or elevations corresponding to the location of the unique-flight as a function of time. Additional data also may be within the scope of a flight path.

Figure 1:
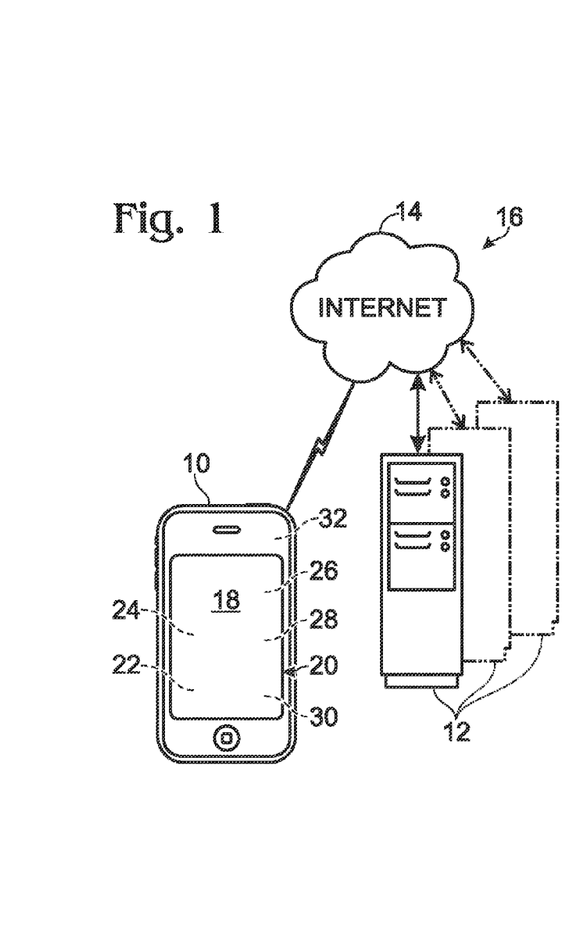
FIG. 1 is a schematic illustration representing illustrative, non-exclusive examples of systems according to the present disclosure for forecasting flight paths.

FIG. 1 schematically illustrates a mobile computing device 10 and a server 12 connected to the Internet 14, and FIG. 1 may be described as illustrating a system 16 according to the present disclosure. Some systems according to the present disclosure include more than one server, as schematically represented in FIG. 1 with two additional servers illustrated in dashed lines; however, systems according to the present disclosure are not limited to 1-3 servers, and any suitable number of servers may be used and/or be associated with systems and methods according to the present disclosure.

As schematically illustrated, mobile computing devices 10 are configured to send and receive data to and from the Internet, and thus to and from associated servers. Examples of suitable mobile computing devices include mobile phones, smart phones, laptop computers, personal digital assistants, tablet PCs, etc. FIG. 1 illustrates a smart phone having a wireless connection to the Internet; however, it is within the scope of the present disclosure that a mobile computing device may additionally or alternatively use a wired connection to the Internet. The mobile computing device illustrated in the Figures resembles an APPLE® IPHONE® device, but other mobile computing devices are within the scope of the present disclosure, and systems and methods according to the present disclosure are not limited to being implemented with or on IPHONE® devices, respectively.

Mobile computing devices 10 according to the present disclosure typically include at least a display device 18, a user input device 20, a processor 22, a storage, or memory, device 24, and a communication device 26 for sending and receiving data. Mobile computing devices 10 may additionally include such optional features as a camera 28, a compass 30, and a global positioning system receiver 32.

User input devices according to the present disclosure may take any suitable form, including (but not limited to) a touch screen, a keyboard, a number pad, a button, a plurality of buttons, etc. Memory devices according to the present disclosure also may take any suitable form for receiving and storing software, or computer-executable instructions. Illustrative, non-exclusive examples of suitable memory devices include (but are not limited to) optical memory devices, flash memory devices, and other memory devices suitable for storing computer-executable instructions, for example, for implementing methods according to the present disclosure.

Also within the scope of the present disclosure are computer readable storage, or memory, media suitable for storing computer-executable instructions, or software, for implementing methods according to the present disclosure. Examples of such media include CD-ROMs, disks, hard drives, etc. such as may include software for transferring and/or downloading to a mobile computing device. As used herein, storage, or memory, devices and media having computer-executable instructions, as well as mobile-computing device implemented methods, server implemented methods, computer implemented methods, and other methods according to the present disclosure are considered to be within the scope of subject matter deemed patentable in accordance with the national laws of the country in which this patent application is pending, such as (but not limited to) Section 101 of Title 35 of the United States Code.

As mentioned, systems according to the present disclosure may include one or more servers 12. Such servers may store, retrieve, and/or send data associated with methods according to the present disclosure, such as (but not limited to) flight data, flight path data, map data, landmark data, and/or any other suitable data associated with methods according to the present disclosure, and as discussed herein. An illustrative, non-exclusive example of one suitable server is a server associated with a provider of software associated with the performance of methods according to the present disclosure. For example, the developer, provider, and/or seller of software that performs methods according to the present disclosure, or an associated person or entity, may maintain one or more servers 12 that store, retrieve, and/or send data associated with methods according to the present disclosure. Additional illustrative, non-exclusive examples of servers within the scope of systems according to the present disclosure include servers maintained by, or associated with, databases having flight data relating to historical flight paths and/or to flight plans of unique-flights. In the United States, illustrative, non-exclusive examples of such servers include those associated with the Federal Aviation Administration's Aircraft Situation Display to Industry program and the Federal Aviation Administration's National Flight Database. Other servers and corresponding databases are also within the scope of the present disclosure, including (but not limited to) non-governmental, private servers and databases and equivalent servers and databases associated with flights within and between countries other than the United States, including associated with international flights.

Figure 2:
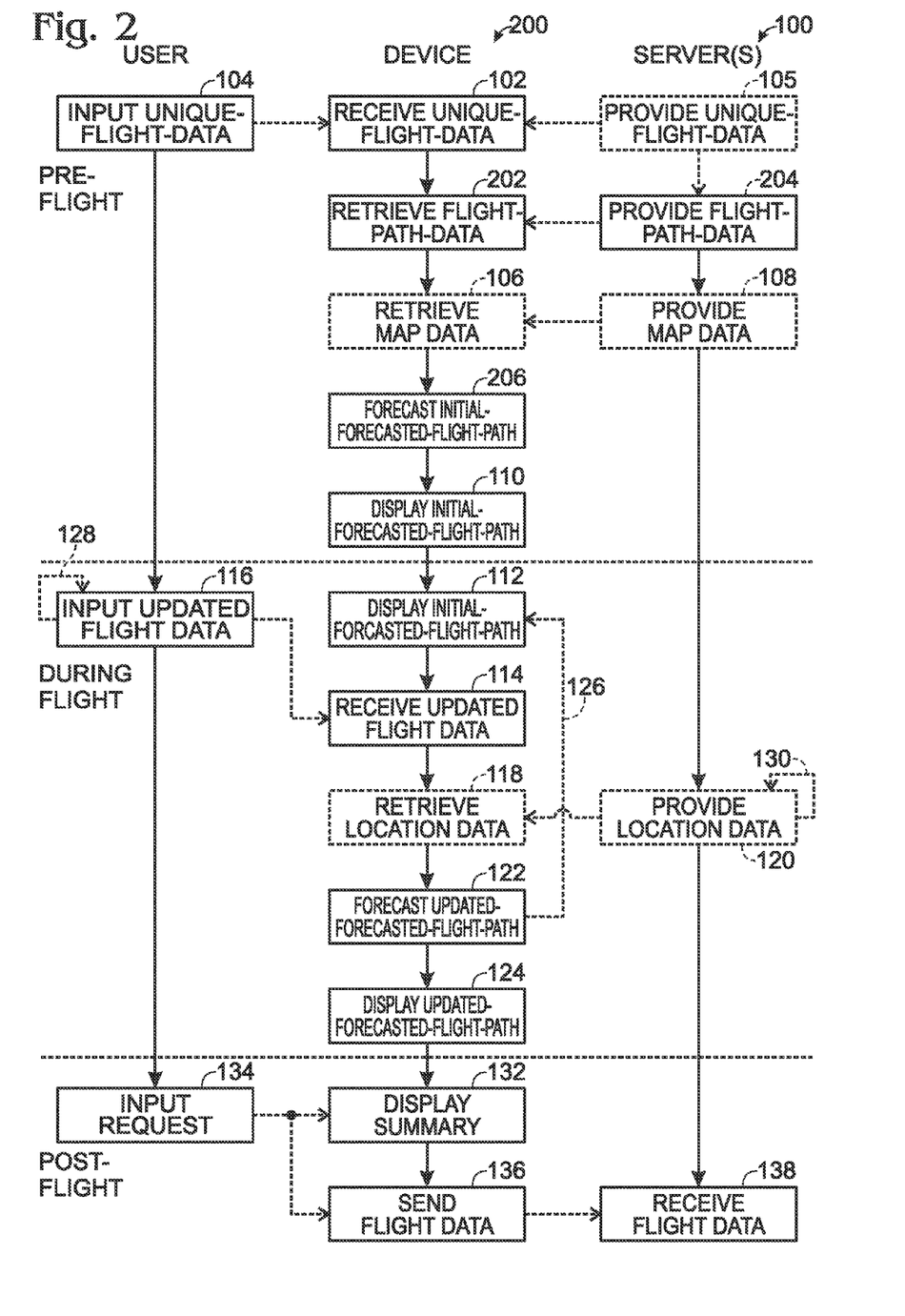
FIG. 2 is a schematic flow chart representing illustrative, non-exclusive examples of mobile computing device implemented methods according to the present disclosure for forecasting flight paths.
Figure 3:
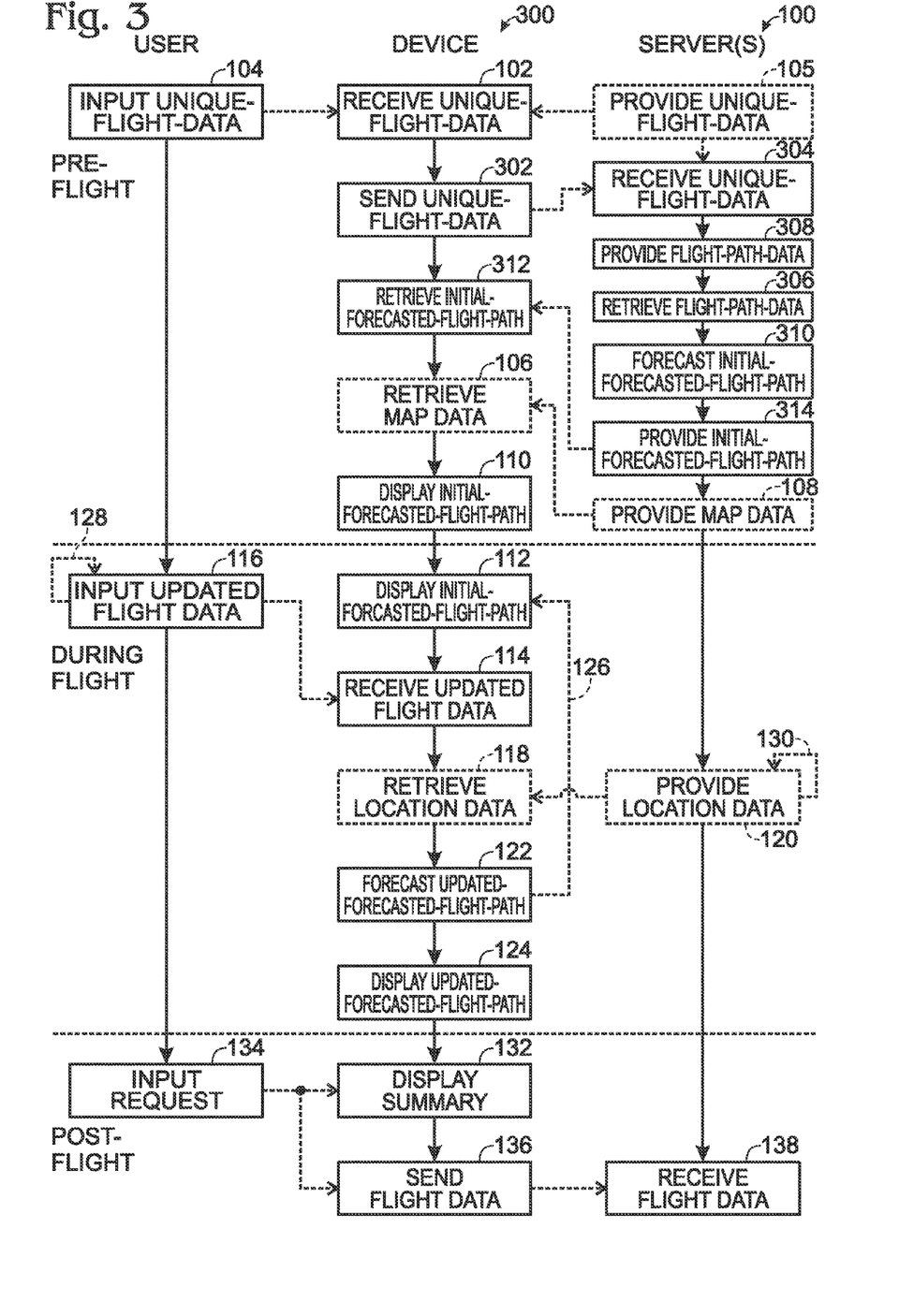
FIG. 3 is a schematic flow chart representing additional illustrative, non-exclusive examples of mobile computing device implemented methods according to the present disclosure for forecasting flight paths.

Turning now to FIGS. 2-3, illustrative, non-exclusive examples of methods according to the present disclosure are schematically illustrated and indicated generally at 100. As indicated, methods according to the present disclosure may be performed by one of a user of a mobile computing device, a mobile computing device itself, and one or more servers, or by a combination thereof. The flow charts of FIGS. 2-3 schematically illustrate the general relationship between steps performed by a user, steps performed by a mobile-computing device, and steps performed by one or more servers, but such indications are not limiting in that such corresponding steps are not necessarily performed at an identical moment in time, and the relationships are depicted for illustrative purposes only. The flow charts also schematically illustrate the timing of the various steps as being performed during one of pre-flight, during flight, or post-flight of a corresponding unique-flight; however, such indications are not limiting in that such corresponding steps are not necessarily required to be performed during such periods of time in all methods according to the present disclosure.

In some methods according to the present disclosure, one or more steps that are performed after departure and prior to arrival (i.e., during the unique-flight) may be performed without the mobile computing device having access to the Internet and/or without the mobile computing device having access to a global positioning system (GPS). Stated differently, mobile-computing devices may not be able to connect to the Internet during a unique-flight, or during a portion of a unique-flight. For example, it is often requested that travelers turn off their mobile computing devices during take-off and landing operations of a flight, and during other times to only use mobile computing devices in airplane mode (i.e., with the wireless communication disabled). That said, it is within the scope of the present disclosure that a mobile computing device may have access to the Internet and/or to a global positioning system during one or more steps performed after departure and prior to arrival of the unique-flight, as discussed herein. That is, in some methods according to the present disclosure all of the steps performed after departure of the unique-flight and prior to arrival of the unique-flight are performed without access to the Internet and/or without access to a global positioning system, and in other methods according to the present disclosure, the mobile computing device may have access to one or both of the Internet and a global positioning system during one or more steps that may be performed after departure of the unique-flight and prior to arrival of the unique-flight. As illustrative, non-exclusive examples, methods according to the present disclosure may include sending information via the Internet to a server (e.g., a server associated with a social networking service) during a flight. Such information may include (but is not limited to) images captured by the mobile computing device during the flight, data associated with a forecasted flight path of the unique-flight, etc.

FIGS. 2-3 illustrate some steps in dashed boxes, with such dashed boxes indicating that such steps may be optional or may correspond to an optional embodiment or version of a method according to the present disclosure. That said, not all methods according to the present disclosure are required to include the steps illustrated in solid boxes. The methods and steps illustrated in FIGS. 2-3 are not limiting and other methods and steps are also within the scope of the present disclosure, including methods having greater than or fewer than the number of steps illustrated, as understood from the discussions herein.

In FIG. 2, illustrative, non-exclusive examples of mobile computing device implemented methods are illustrated and indicated generally at 200. Methods 200 may be described as methods in which an initial forecast of a unique-flight's flight path is performed by the mobile computing device. In FIG. 3, additional illustrative, non-exclusive examples of mobile computing device implemented methods are illustrated and indicated generally at 300. The methods illustrated in FIG. 3, may be described as methods in which an initial forecast of a unique-flight's flight path is performed remotely, such as by an associated server. Methods 200 and methods 300 are each illustrated together with corresponding steps or actions that may be performed by a user of a mobile computing device and by associated servers, and are all considered to be within the scope of methods 100 according to the present disclosure.

Referring to both FIGS. 2-3 and both methods 200 and methods 300, a mobile computing device may receive flight data associated with a unique-flight, as indicated at 102. This flight data may additionally or alternatively be referred to as initial flight data or as unique-flight-data. In some methods, this flight data may be received from a user that directly inputs the flight data into the mobile computing device, as indicated at 104, for example by a traveler prior to an upcoming flight.

It is also within the scope of the present disclosure that the mobile computing device may additionally or alternatively receive the unique-flight-data from a server via the Internet. That is, a server may optionally provide the flight data, as indicated at 105. Illustrative, non-exclusive examples of suitable servers include ones that are associated with a flight itinerary service, an online airfare booking service, or other online service which may store the flight data of a unique-flight for a traveler. The TRIPIT® online service is an example of a service which may be configured to interact with mobile computing devices and software configured to implement methods according to the present disclosure. In other words, rather than a traveler manually inputting the flight data into the mobile computing device, the mobile computing device may receive, or retrieve, the flight data from an online service.

Additionally or alternatively, another suitable server for providing the unique-flight-data is a server associated with a provider of software associated with the performance of methods according to the present disclosure. For example, the provider may host a service in which users of software according to the present disclosure may maintain an online profile and input data corresponding to an upcoming flight, for example, via a user's mobile computing device or via a computer other than a mobile computing device. Then, the mobile computing device may receive, or retrieve, the unique-flight-data via such service. In such an embodiment, this service may also be described as a flight itinerary service.

The unique-flight-data that is received by the mobile computing device identifies a unique-flight and therefore may include such data as one or more of a flight identifier code, an airline, a scheduled departure time, a scheduled arrival time, a departure location, and an arrival location. Also within the scope of unique-flight-data may be data associated with a flight itinerary service, such as logon information associated with the flight itinerary service, such as input by a user so that other unique-flight-data may then be retrieved from the flight itinerary service.

Figure 4:
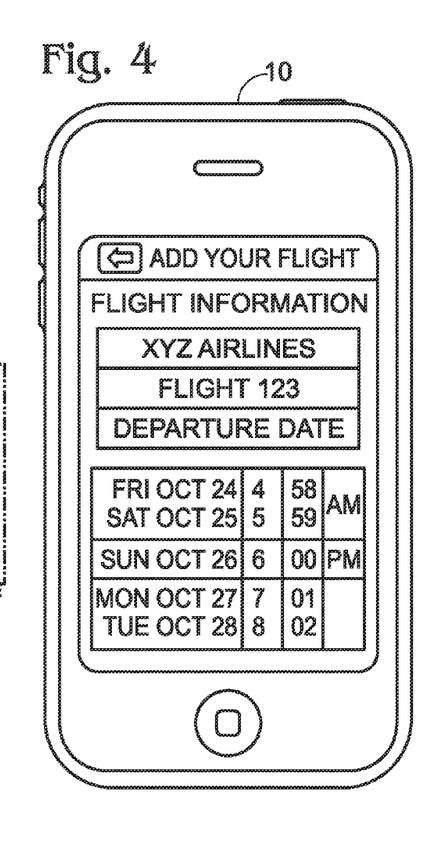
FIG. 4 is an illustration of an illustrative, non-exclusive example of a mobile computing device displaying an illustrative, non-exclusive example of a screen associated with a method according to the present disclosure for forecasting flight paths.

FIG. 4 illustrates an illustrative, non-exclusive example of an input screen displayed by a mobile computing device 10 for inputting unique-flight-data. As seen in the example, an airline and a flight identifier code have been input by a user, and a departure date is in the process of being selected by a user.

In methods 300 according to the present disclosure, the unique-flight-data may then be sent to a server, as indicated at 302 in FIG. 3, and the server may receive the unique-flight-data, as indicated at 304 in FIG. 3. An example of a suitable server is a server that is associated with a provider of software associated with the performance of methods according to the present disclosure, as discussed herein. Additionally or alternatively, however, the server may receive the unique-flight-data from a source other than the mobile computing device, including (but not limited to) a computer other than the mobile computing device (e.g., a desktop computer used by the traveler) or another server (e.g., a server that is associated with a flight itinerary service, an online airfare booking service, or other online service which may store the flight data of a unique-flight for a traveler). The TRIPIT® online service, discussed herein, is an illustrative, non-exclusive example of a suitable source for the unique-flight-data service to be provided to the server associated with methods according to the present disclosure. In other words, rather than a traveler manually inputting the flight data into the mobile computing device and/or a separate computer, which then sends the flight data to the server, the server may receive, or retrieve, the unique-flight-data from an online service.

Next, with reference to FIG. 2 and methods 200 according to the present disclosure, the mobile computing device may retrieve data associated with the flight path of the unique-flight, as indicated at 202. On the other hand, with reference to FIG. 3 and with respect to methods 300, the server that received the unique-flight-data may retrieve data associated with the flight path of the unique-flight, as indicated at 306. This retrieved data may be referred to herein as flight-path-data, and as indicated in FIG. 2 at 204 and in FIG. 3 at 308, may be provided by a server. Such a server may be described as a flight-data-server, and may correspond to any suitable server, as discussed herein.

In some methods 100 according to the present disclosure, the flight-path-data may include historical-flight-path-data that relates to previous instances of flights from the origin to the destination of the unique-flight. Accordingly, this historical-flight-path-data may include such illustrative, non-exclusive data as coordinates, elevations, headings, speeds, flight durations, locations of turbulence, and taxi durations of the previous instances of flights from the origin to the destination of the unique-flight. Also within the scope of the historical-flight-path-data may be historical data associated with the particular aircraft model associated with the unique-flight. For example, average cruising speeds, average ascent times, average descent times, average takeoff speeds, and average landing speeds associated with the particular aircraft model may be within the scope of historical-flight-path-data and may be described as aircraft model data. Aircraft model data may be saved as, or otherwise associated with, a profile corresponding to various aircraft models. For example, a provider of software associated with the performance of methods according to the present disclosure may maintain profiles for various aircraft models and use, or provide, this aircraft model data for flight path forecasting, as discussed herein. None of these examples are required to be within the scope of historical-flight-path-data, and any subset of the identified data, as well as additional data not identified, are within the scope of the present disclosure. The Federal Aviation Administration's Aircraft Situation Display to Industry program is an illustrative, non-exclusive example of a source of at least a subset of such historical-flight-path-data.

Additionally or alternatively, in some methods 100 according to the present disclosure, the flight-path-data may include a flight-plan, such as (but not limited to) the specific flight-plan of the unique-flight as prepared by the pilot, the airline, or another person or entity associated with the unique-flight. This flight-plan may include such illustrative, non-exclusive data as one or more of departure procedures, planned coordinates, planned way-points, arrival procedures, planned elevations, planned headings, planned speeds, planned flight duration, and planned taxi durations for the unique-flight. None of these examples are required to be within the scope of the flight-plan, and any subset of the identified data, as well as additional data not identified, are within the scope of the present disclosure. The Federal Aviation Administration's National Flight Database is an illustrative, non-exclusive example of a source of flight-plans.

In some versions of methods 100 according to the present disclosure (but not required to all versions), the mobile computing device may additionally receive, or retrieve, map data, as indicated at 106 in FIGS. 2-3. Correspondingly, a server, or a map server, may provide such map data, as indicated at 108. This map data may be described as being associated with regions adjacent to a flight line corresponding to the flight path of the unique-flight. As used herein, a flight line may be described as a subset of flight-path-data, in so far as a flight line corresponds to the historical, forecasted, or actual two-dimensional path of a flight relative to the ground, without respect to timing. A flight line, as used herein, also may refer to a two-dimensional representation, or indicia, of a flight path on a map. Various regions may be considered adjacent to a flight line, with such illustrative, non-exclusive examples as regions that are within 10, 100, 150, 200, 250, 300, 400, 500, 1000, 0-1000, 50-1000, 100-500, 300-1000, 500-1000, 0-500, 100-500, or 300-500 land, or ground, miles from the flight line. Regions that are within or outside of the enumerated ranges and values are also within the scope of the present disclosure. An illustrative, non-exclusive example of a suitable server is one that is associated with the GOOGLE® map service.

In methods 200 according to the present disclosure, and as indicated at 206 in FIG. 2, the mobile computing device may forecast an initial-forecasted-flight-path for the unique-flight based on the flight-path-data that was retrieved at 202. With respect to methods 300 on the other hand, and as indicated at 310 in FIG. 3, a flight-data-server may forecast the initial-forecasted-flight-path for the unique-flight based on the flight-path-data that was retrieved at 306. Illustrative, non-exclusive examples of data within the scope of an initial-forecasted-flight-path include an initial-forecasted-departure-time, an initial-forecasted-arrival-time, initial-forecasted-coordinates, initial-forecasted-elevations, initial-forecasted-headings, initial-forecasted-speeds, an initial-forecasted-flight-duration, initial-forecasted-turbulence, and initial-forecasted-taxi-durations. One or more of such data, including two, three, four, five or more of such examples may be included within the scope of the initial-forecasted-flight-path-data. In some versions of methods according to the present disclosure, at least the initial-forecasted-arrival-time is included within the forecasted-flight-path-data. These various initial-forecasted data may be forecasted, interpolated, extrapolated, predicted, and/or otherwise calculated by any suitable method based at least in part on the retrieved flight-path-data, an illustrative, non-exclusive example of which includes weighted means averaging of the historical-flight-path-data. Other methods of forecasting are also within the scope of the present disclosure and may be used to forecast the initial-forecasted-flight-path.

FIG. 2 schematically illustrates the initial forecasting step 206 as occurring prior to departure of the unique-flight; however, it is within the scope of the present disclosure that this initial forecasting step in methods 200 according to the present disclosure may be performed after departure of and during the unique-flight. As an illustrative, non-exclusive example, depending on the timing of the retrieval of the flight-path-data (202), a traveler may be required to turn off his/her mobile computing device (per the instructions of the flight crew of his/her flight) before the mobile computing device has an opportunity to perform the forecasting step 206. In such a situation, when the traveler is permitted to turn on his/her mobile computing device during the flight, the mobile computing device may then perform the forecasting step.

In methods 300, on the other hand, and as indicated at 312 in FIG. 3, the mobile computing device retrieves the initial-forecasted-flight-path from the server that forecasted the initial-forecasted-flight-path, and which may be referred to herein as a flight-data-server. That is, a method 300 according to the present disclosure may be described as including retrieving from a flight-data-server via the Internet an initial-forecasted-flight-path based on flight-path-data for the unique-flight. Correspondingly, the server provides the initial-forecasted-flight-path, as indicated at 314. The retrieval of the initial-forecasted-flight-path is typically performed prior to departure of the unique-flight because of a possible limitation on Internet access for the mobile computing device during the unique-flight. However, as discussed herein, some aircraft are equipped with Internet capabilities, and therefore it is within the scope of methods 300 according to the present disclosure that a mobile computing device may retrieve the initial-forecasted-flight-path after departure of the unique-flight.

Next, as indicated at 110 and 112 in FIGS. 2-3, and after forecasting the initial-forecasted-flight-path-data, the mobile computing device may display indicia associated with the initial-forecasted-flight-path. Depending on the timing of the forecasting, as discussed above, the displaying of indicia may be performed prior to departure of the unique-flight, as indicated at 110, and/or after departure of and during the unique-flight, as indicated at 112. Illustrative, non-exclusive examples of such indicia may include one or more of a map, a forecasted-flight-line on a map, a forecasted-current-location of the unique-flight on a map, a forecasted-arrival-time, forecasted coordinates, forecasted elevations, forecasted headings, forecasted speeds, forecasted flight duration, forecasted taxi durations, a historical flight line on a map, and information associated with landmarks adjacent the forecasted-flight-line. None of these examples are required to be within the scope of historical-flight-path-data, and any subset of the identified indicia, as well as additional indicia not identified, are within the scope of the present disclosure. Furthermore, such indicia may be displayed in any suitable format to the user, such as in graphical and/or textual formats.

Figure 5:
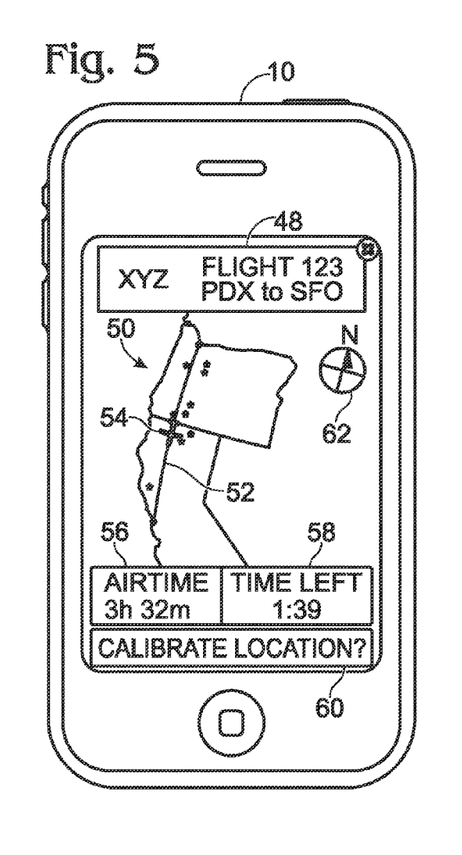
FIG. 5 is an illustration of the mobile computing device of FIG. 4 displaying another illustrative, non-exclusive example of a screen associated with a method according to the present disclosure for forecasting flight paths.

FIG. 5 illustrates an illustrative, non-exclusive example of indicia associated with an initial-forecasted-flight-path displayed on a mobile computing device 10. In the example illustrated, the indicia includes unique-flight-data 48, a map 50, a forecasted-flight-line 52 on the map, a forecasted-current-location of the unique-flight 54, a forecasted-flight-duration 56, a forecasted length of time remaining for the unique-flight 58, and indicia associated with landmarks (represented by stars in FIG. 5).

After departure of the unique-flight and prior to arrival of the unique-flight, the mobile computing device may receive user-inputted-updated-flight-data associated with the unique-flight, as indicated at 114 in FIGS. 2-3. Correspondingly, a user may input the user-inputted-updated-flight-data, as indicated at 116. Illustrative, non-exclusive examples of user-inputted-updated-flight-data includes (but is not limited to) an updated departure time, an updated scheduled arrival time, a current location of the unique-flight, an identity of a landmark adjacent to the current location of the unique-flight, an image of a region adjacent to the current location of the unique-flight, an orientation of the mobile computing device, and any other suitable data. None of these examples are required to be within the scope of the user-inputted-updated-flight-data, and any subset of the identified data, as well as additional data not identified, are within the scope of the present disclosure. Various sources of this data may be used. For example, a traveler may have noted the time that the unique-flight left the gate at the airport, the time that the unique-flight took to taxi from the gate to take-off, the time of take-off, etc. Additionally or alternatively, the traveler may note the location of the unique-flight based on an identified landmark out the window of the aircraft, and thus the approximate location of the unique-flight. A flight crew member may announce the location of the unique-flight, the actual departure time, an estimated flight duration, an estimated length of time remaining in the flight, an estimated arrival time, etc.

Figure 6:
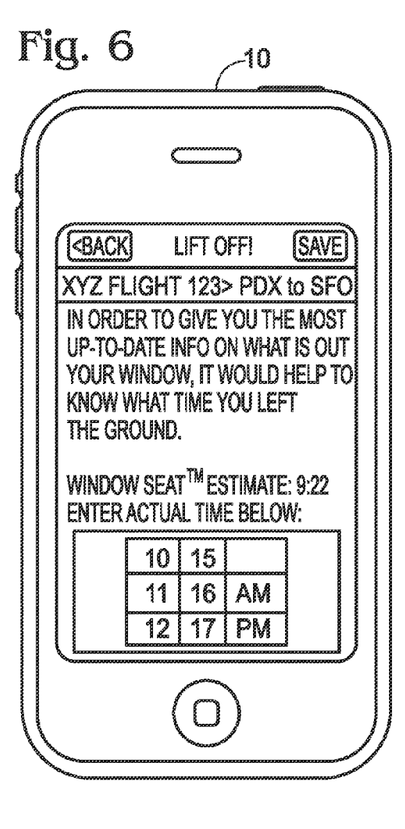
FIG. 6 is an illustration of the mobile computing device of FIG. 4 displaying another illustrative, non-exclusive example of a screen associated with a method according to the present disclosure for forecasting flight paths.
Figure 7:
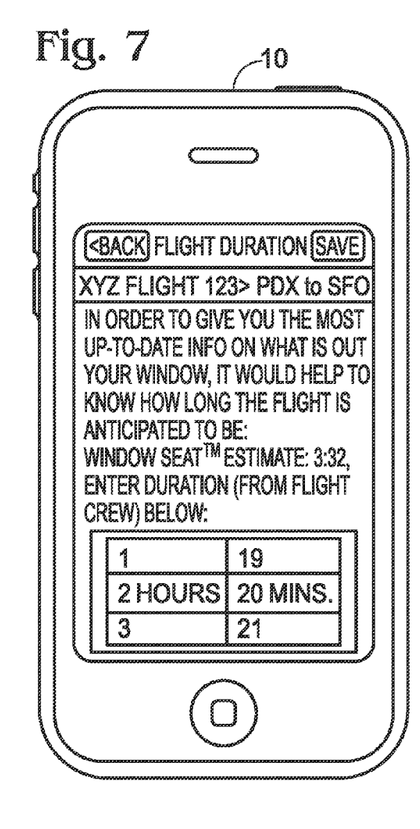
FIG. 7 is an illustration of the mobile computing device of FIG. 4 displaying another illustrative, non-exclusive example of a screen associated with a method according to the present disclosure for forecasting flight paths.
Figure 8:
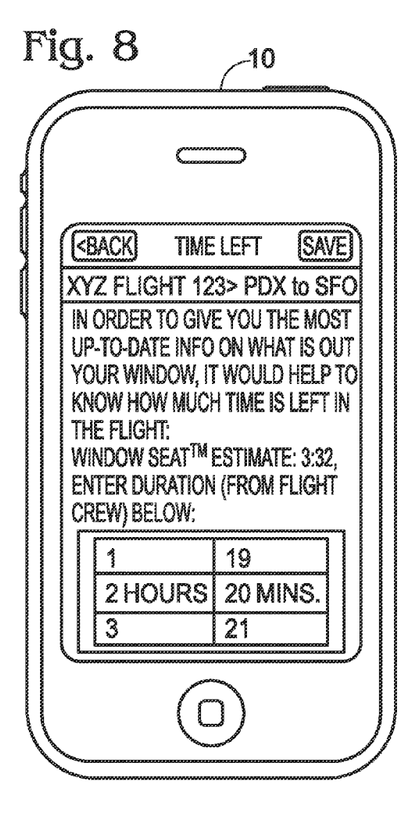
FIG. 8 is an illustration of the mobile computing device of FIG. 4 displaying another illustrative, non-exclusive example of a screen associated with a method according to the present disclosure for forecasting flight paths.

FIG. 5 includes an illustrative, non-exclusive example of indicia, by which a user is queried if he/she would like to update the forecasted flight path, as indicated at 60. FIGS. 6-8 illustrate illustrative, non-exclusive examples of input screens displayed by a mobile computing device 10 for inputting user-inputted-updated-flight-data. In the examples illustrated, the mobile computing device is configured to receive an actual departure time, an estimated flight duration, and an estimated length of time remaining in the flight, respectively.

Figure 9:
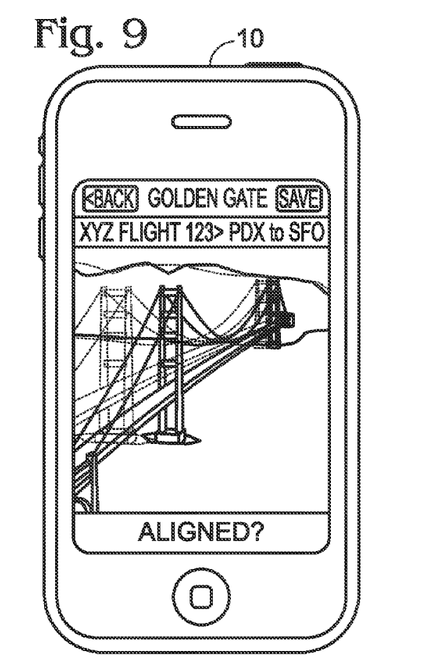
FIG. 9 is an illustration of the mobile computing device of FIG. 4 displaying another illustrative, non-exclusive example of a screen associated with a method according to the present disclosure for forecasting flight paths.

As mentioned, user-inputted-updated-flight-data may include an image of a region adjacent to the current location of the unique-flight. For example, the mobile computing device may include a camera, and the traveler may use the camera feature to view a land feature out the window of the aircraft. The mobile computing device may use the image of the land feature to identify the land feature and thus to determine the approximate location of the unique-flight. As an illustrative, non-exclusive example, the mobile computing device may display a map, or a previously captured image, overlaid with the current image being received by the camera. In the example of a previously captured image, the previously captured image may have been taken by another user of a mobile computing device having software according to the present disclosure on a similar flight to the unique-flight, such as associated with another user's flight profile, as discussed herein, and received, or retrieved, from a server during a method according to the present disclosure. The user may manipulate the mobile computing device, or the camera thereof, until the image and the map, or previously captured image, at least approximately correspond to each other. That is, the user may position the camera so that the land features out the window are aligned with, or are at least approximately aligned with, the corresponding land features on the displayed map, or previously captured image. Examples of suitable land features may include roads, mountains, towns, cities, farms, buildings, bridges, etc. Once aligned, or at least approximately aligned, the mobile computing device may receive user input to associate the camera's image with the map, such as in response to a user pressing a button, touching an icon, etc. An illustrative, non-exclusive example of this subject matter is illustrated in FIG. 9, in which a previously captured image (illustrated in dashed lines) is being aligned with a real-time image illustrated in solid lines. An icon with indicia of "ALIGNED?" is included in the illustrated example, so that when the images are aligned, or at least approximately aligned, the user may engage the icon. This information may then be used at least partially in forecasting an updated-forecasted-flight-path according to the present disclosure. Additionally or alternatively, this information, or data, which may include the timing of the capture image, may be subsequently sent to a server associated with a service provider, such as a provider of software associated with the performance of methods according to the present disclosure. Such a service provider may then use this data for statistical purposes, such as (but not limited to) updating algorithms for future flight path forecasting, etc.

Additionally or alternatively, and as mentioned, user-inputted-updated-flight-data may include the orientation of the mobile computing device. For example, the mobile computing device may include a compass, or other device configured to detect the orientation of the mobile computing device, and the traveler may use the compass feature to input the orientation of the mobile computing device relative to the aircraft. For example, a user may position the mobile computing device so that it is aligned with the longitudinal axis of the aircraft, and then press a button, touch an icon, or otherwise indicate when the mobile computing device is in a predetermined orientation. The orientation may then be associated with a flight path (whether historical or forecasted) of the unique-flight, for example to determine if the unique-flight is on a particular heading, or course. Stated differently, a method according to the present disclosure may include detecting with the compass an orientation of the mobile computing device and then receiving user input to associate the orientation of the mobile computing device with a flight path. FIG. 5 illustrates an illustrative, non-exclusive example of indicia of a compass 62 displayed on a mobile computing device 10.

Next, as schematically illustrated in a dashed box at 118 in FIGS. 2-3, some methods according to the present disclosure may include a step of receiving location data from a source other than a user. As an illustrative, non-exclusive example, some aircrafts include Internet access that travelers may connect to with mobile computing devices. In such situations, the mobile computing device may be permitted to establish a connection to the Internet and to retrieve location data from a server, as indicated at 120. That is, methods 100 according to the present disclosure may include a step of establishing a connection to the Internet after departure of the unique-flight and prior to arrival of the unique-flight. The retrieved location data may be described as recent location data associated with the unique-flight and may include such illustrative, non-exclusive data as may be associated with coordinates, elevations, headings, speeds, and times of the unique-flight in real-time or near real-time. Such data may be available from the Federal Aviation Administration's Aircraft Situation Display to Industry program, for example, or from another source that actively tracks flights in real-time or near real-time.

Additionally or alternatively, such location data may be retrieved, or received, from a global positioning system (GPS), when a mobile computing device includes such capabilities and such capabilities are active, or when the traveler is permitted to configure the mobile computing device to receive wireless signals. Accordingly, a method according to the present disclosure may be described as including receiving from one or more GPS satellites location data associated with the current location of the mobile computing device.

Next, as indicated at 122, methods 100 according to the present disclosure may include forecasting an updated-forecasted-flight-path based at least in part on the data received at step 114 and/or at step 118. The updated-forecasted-flight-path may additionally (but is not required to) be based at least in part on the initial-forecasted-flight-path and/or the flight-path-data received by the mobile computing device prior to departure of the unique-flight; however, in methods that include receiving location data during the flight, such as real-time or near real-time location data via the Internet, the updated-forecasted-flight-path may not necessarily be based on the initial-forecasted-flight-path.

The updated-forecasted-flight-path may be described as including one or more of an updated current location of the unique-flight, an updated forecasted arrival time, updated forecasted coordinates, updated forecasted elevations, updated forecasted headings, updated forecasted speeds, and an updated forecasted flight duration. None of these examples are required to be within the scope of the updated-forecasted-flight-path, and any subset of the identified examples, as well as additional examples not identified, are within the scope of the present disclosure.

Next, as indicated at 124, methods 100 according to the present disclosure may include displaying indicia associated with the updated-forecasted-flight-path. Such indicia may include one or more of a map, an updated forecasted flight line on a map, an updated forecasted current location of the unique-flight on a map, an updated forecasted arrival time, updated forecasted coordinates, updated forecasted elevations, updated forecasted headings, updated forecasted speeds, an updated forecasted flight duration, and an updated length of time remaining for the unique-flight. None of these examples are required to be within the scope of the indicia associated with the updated-forecasted-flight-path, and any subset of the identified examples, as well as additional examples not identified, are within the scope of the present disclosure. FIG. 4, discussed herein, illustrates an illustrative, non-exclusive example of indicia associated with an updated-forecasted-flight-path displayed on a mobile computing device 10.

As schematically indicated with the dashed lines at 126 in FIGS. 2-3, methods 100 according to the present disclosure may include repeating one or both of the receiving user-inputted-flight-data (114), the receiving, or retrieving, location data (118), followed by repeating the forecasting of an updated-forecasted-flight-path and the displaying indicia associated with the updated-forecasted-flight-path. Stated differently, one or more of the receiving, the forecasting, and the displaying steps performed after departure of the unique-flight and prior to arrival of the unique-flight may be repeated. Correspondingly, as indicated at 128, a user may input user-inputted-flight-data on more than one occasion, and as indicated at 130, a server may provide location data on more than one occasion.

Various other features of mobile computing device implemented methods according to the present disclosure may be available after departure of a unique-flight and prior to arrival of the unique-flight. As mentioned, an example of historical-flight-path-data that may be available relates to the location of turbulence associated with previous instances of flights, and an initial-forecasted-turbulence may be within the scope of an initial-forecasted-flight-path. Accordingly, methods according to the present disclosure may include, after departure of the unique-flight and prior to arrival of the unique-flight, alerting the user of forecasted turbulence. As an illustrative, non-exclusive example, certain airspace may be particularly prone to turbulence, and when a unique-flight approaches such airspace, the mobile computing device may display indicia, vibrate, and/or emit a sound, alerting the user that turbulence may be forthcoming.

Additionally or alternatively, prior to departure of the unique-flight, or after departure of the unique-flight in situations in which access to the Internet is permitted and established, the mobile computing device may retrieve from a landmark data server via the Internet landmark data associated with one or more landmarks that are adjacent to a flight line corresponding to the flight path of the unique-flight (i.e., corresponding to one of an initial-forecasted-flight-path or an updated-forecasted-flight-path). Various regions may be considered adjacent to a flight line, with such illustrative, non-exclusive examples as regions that are within 10, 100, 150, 200, 250, 300, 400, 500, 1000, 0-1000, 50-1000, 100-500, 300-1000, 500-1000, 0-500, 100-500, or 300-500 land, or ground, miles from the flight line. Regions that are within or outside of the enumerated ranges and values are also within the scope of the present disclosure. Illustrative, non-exclusive examples of landmark data includes information related to ground features, towns, cities, historical locations, mountains, rivers, highways, states, regions, and other information that may be described as encyclopedic information, and may include textual, graphical, and/or pictorial information. An illustrative, non-exclusive example of a landmark data server includes a server associated with the WIKIPEDIA® service.

Figure 10:
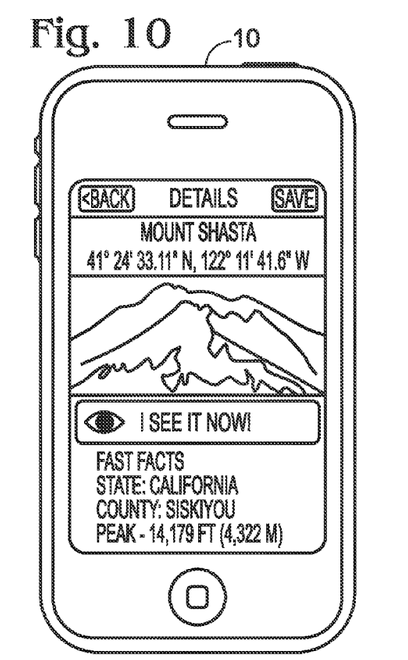
FIG. 10 is an illustration of the mobile computing device of FIG. 4 displaying another illustrative, non-exclusive example of a screen associated with a method according to the present disclosure for forecasting flight paths.

In such methods that include retrieving landmark data, such methods may further include displaying a map with a flight line associated with the unique-flight, with such map including indicia associated with one or more landmarks. Such a map may also be within the scope of a forecasted-flight-path, as used herein. Accordingly, a method according to the present disclosure may further include receiving user input to select one of the one or more landmarks displayed on the map, and then displaying data associated with the selected landmark, such as displaying the aforementioned encyclopedic information. FIG. 5 illustrates an illustrative, non-exclusive example of indicia of a map 50 with a flight line 52 and indicia associated with one or more landmarks, represented by the stars on the map. In some methods according to the present disclosure, a user may select a landmark, such as by engaging one of the stars, at which point the mobile computing device may display data associated with the selected landmark. FIG. 10 illustrates an illustrative, non-exclusive example of the display of such landmark data on a mobile computing device 10.

Additionally or alternatively, in conjunction with the displaying data associated with a selected landmark, the mobile computing device may be configured to receive user input indicating when a specific landmark is viewable by the user, and thus use this information to at least in part forecast an updated-forecasted-flight-path. An illustrative, non-exclusive example of this subject matter is illustrated in FIG. 10, in which a user may select the indicia including "I SEE IT NOW!" Other configurations are also within the scope of the present disclosure. Additionally or alternatively, information, or data, associated with the timing of the viewing of one or more landmarks, may be subsequently sent to a server associated with a service provider, such as a provider of software associated with the performance of methods according to the present disclosure. Such a service provider may then use this data for statistical purposes, such as (but not limited to) updating algorithms for future flight path forecasting, etc.

Figure 11:
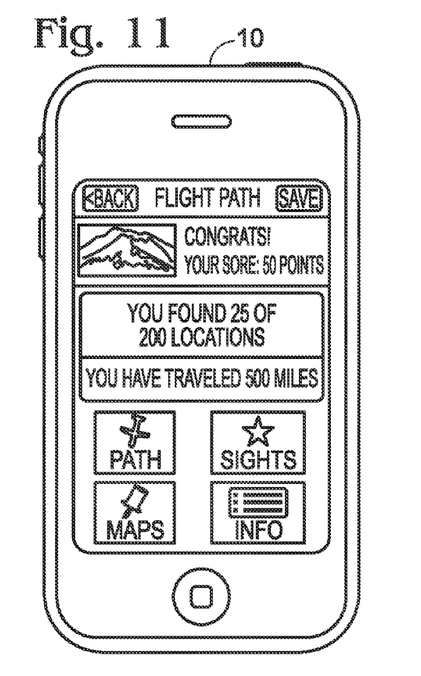
FIG. 11 is an illustration of the mobile computing device of FIG. 4 displaying another illustrative, non-exclusive example of a screen associated with a method according to the present disclosure for forecasting flight paths.

Additionally or alternatively, in methods that include retrieving landmark data, a game associated with the landmark data may be implemented. For example, a method may include providing a game for the user to play, in which the game includes querying the user to identify one or more landmarks that are viewable out the window of the aircraft and/or that are displayed on the mobile computing device, and rewarding the user for correctly identifying the one or more landmarks. Additionally or alternatively, a method may be described as including displaying indicia that queries a user for an identity of one or more landmarks, receiving from the user an input associated with the identity, comparing the input to the identity, and displaying indicia based on the comparing. Other configurations of games and interactive activities associated with the identity of landmarks viewable out the window of the aircraft and/or displayed on the mobile computing device are also within the scope of the present disclosure. FIG. 11 illustrates an illustrative, non-exclusive example of indicia displayed on a mobile computing device that is associated with a game.

Additionally or alternatively, methods that include retrieving landmark data, may further include a comparison of the location of one or more landmarks with the flight path, or flight line, of the unique-flight, for example, so that the user may select a preferred side of the aircraft to sit on, based on the number of landmarks viewable from a particular side or based on one or more particular landmarks that the user is interested in viewing. Accordingly, a method according to the present disclosure may be described as including prior to departure of the unique-flight, displaying indicia associated with a comparison of the flight path of the unique-flight and locations of one or more landmarks adjacent the flight path of the unique-flight.

Additionally or alternatively, when a mobile computing device includes a camera, a method 100 according to the present disclosure may include after departure of the unique-flight and prior to arrival of the unique-flight, receiving an image via the camera, and in response to user input, associating the image with a flight profile associated with the unique-flight. For example, software according to the present disclosure may allow for a user to save data associated with the flight path of the unique-flight into, or as part of, a flight profile saved on the mobile computing device, with such flight profile including images taken during the unique-flight. As an illustrative, non-exclusive example, a flight profile may include a saved map having a flight line associated with it and selectable indicia corresponding to locations along the flight line where the user took a picture. Accordingly, when reviewing the flight profile, the locations may be selected and the corresponding image may be displayed. Other configurations of flight profiles, including flight profiles with associated images and flight profiles without associated images are within the scope of the present disclosure. Stated differently, a method 100 according to the present disclosure may include displaying a map with a flight line associated with the unique-flight, with the map including indicia associated with the image that was received via the camera.

Additionally or alternatively, when an image is captured, data associated with the timing and/or location of the capturing of the image, for example, in relation to the flight-path or flight profile of the unique-flight, may be saved. This data may be described as metadata associated with the image and may include any suitable data associated with the unique-flight. The image, including its metadata, or just the metadata itself, subsequently may be sent to a server associated with a service provider, such as a provider of software associated with the performance of methods according to the present disclosure. Such a service provider may then use this metadata for statistical purposes, such as (but not limited to) updating algorithms for future flight path forecasting, etc.

As mentioned, methods 100 according to the present disclosure may (but are not required to) include steps that are performed after arrival of a unique-flight, as schematically indicated in FIGS. 2-3. For example, as indicated at 132, methods according to the present disclosure may include displaying a flight summary associated with the unique-flight, and as indicated at 134, such displaying may be in response to a request from a user. Illustrative, non-exclusive examples of information that may be associated with a flight summary according to the present disclosure include (but are not limited to) one or more of a flight line on a map, an original forecasted departure time, an updated forecasted departure time, an actual departure time, an original forecasted arrival time, an updated forecasted arrival time, an actual arrival time, an original forecasted flight duration, an updated forecasted flight duration, an actual flight duration, data associated with user input received during the unique-flight, and images received by the mobile computing device during the unique-flight. None of these examples are required to be within the scope of a flight summary, and any subset of the identified examples, as well as additional examples not identified, are within the scope of the present disclosure.

Figure 12:
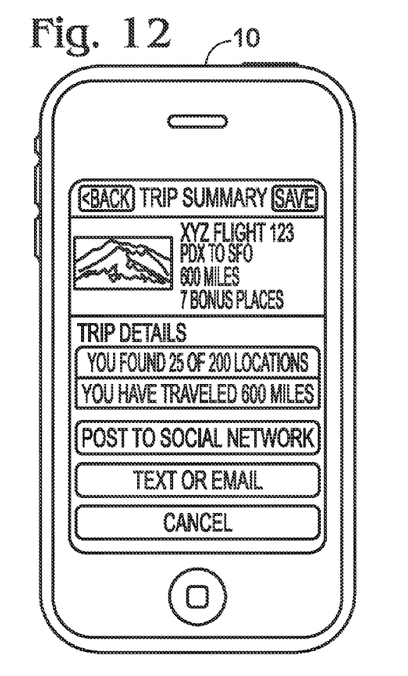
FIG. 12 is an illustration of the mobile computing device of FIG. 4 displaying another illustrative, non-exclusive example of a screen associated with a method according to the present disclosure for forecasting flight paths.

Additionally or alternatively, as indicated at 136, and in response to a user request (134), the mobile computing device may send via the Internet data associated with the unique-flight, with a flight profile, and/or with a flight summary. Correspondingly, as indicated at 138, a server may receive such data. Illustrative, non-exclusive examples of servers for receiving such data include (but are not limited to) a server associated with a provider of software associated with the performance of methods according to the present disclosure, a server associated with a social networking site, an email server, a web site server, and a server associated with a short message service (SMS). Stated differently, a method according to the present disclosure may include, after arrival of a unique-flight, sending via the Internet data associated with the unique-flight to one or more of a social networking site, a server associated with methods according to the present disclosure, an email address, a web site, and an SMS address. An illustrative, non-exclusive example of indicia associated with sending a flight summary is illustrated in FIG. 12.

Also within the scope of the present disclosure are methods in which a service provider, such as a provider of software associated with the performance of methods according to the present disclosure, receives and saves data associated with a unique-flight after the unique-flight. This data may then be used for statistical purposes, such as (but not limited to) updating algorithms for future flight path forecasting, etc.

The following enumerated paragraphs represent illustrative, non-exclusive ways of describing inventions according to the present disclosure.

A A mobile computing device implemented method for forecasting a flight-path of a unique-flight from an origin to a destination, the method comprising:

prior to departure of the unique-flight, receiving unique-flight-data associated with the unique-flight and identifying the unique-flight;

prior to departure of the unique-flight, retrieving from a flight-data-server via the Internet flight-path-data associated with the unique-flight;

forecasting an initial-forecasted-flight-path for the unique-flight based on the flight-path-data; and displaying on a display of the mobile computing device indicia associated with the initial-forecasted-flight-path.

A1 The method of paragraph A, wherein the receiving, the retrieving, the forecasting, and the displaying are performed by the mobile computing device.

A2 The method of paragraph A, wherein the forecasting is performed by a server.

A3 The method of any of paragraphs A-A2, wherein the forecasting is performed prior to departure of the unique-flight.

A4 A mobile computing device implemented method for forecasting a flight-path of a unique-flight from an origin to a destination, the method comprising:

prior to departure of the unique-flight, retrieving from a flight-data-server via the Internet an initial-forecasted-flight-path based on flight-path-data for the unique-flight; and displaying on a display of the mobile computing device indicia associated with the initial-forecasted-flight-path.

A4.1 The method of paragraph A4, wherein the retrieving and the displaying are performed by the mobile computing device.

A5 The method of any of paragraphs A-A4.1, wherein the unique-flight-data includes one or more of a flight identifier code, an airline, a scheduled departure time, a scheduled arrival time, a departure location, an arrival location, and data associated with a flight itinerary service.

A6 The method of any of paragraphs A-A5, wherein the unique-flight-data is received from a user of the mobile computing device.

A7 The method of any of paragraphs A-A6, wherein the unique-flight-data is received from a flight itinerary service.

A8 The method of any of paragraphs A-A7, wherein the flight-path-data includes historical-flight-path-data, wherein the historical-flight-path-data relates to previous instances of flights from the origin to the destination, wherein the historical-flight-path-data includes one or more of data associated with coordinates, elevations, headings, speeds, flight durations, locations of turbulence, and taxi durations of the previous instances of flights.

A9 The method of any of paragraphs A-A8, wherein the flight-path-data includes a flight-plan, wherein the flight-plan includes one or more of departure procedures, planned coordinates, planned way-points, arrival procedures, planned elevations, planned headings, planned speeds, planned flight duration, and planned taxi durations for the unique-flight.

A9.1 The method of paragraph A9, wherein the flight-plan is associated with the Federal Aviation Administration's National Flight Database or an equivalent database.

A10 The method of any of paragraphs. A-A9.1, wherein the initial-forecasted-flight-path includes one or more of an initial-forecasted-departure-time, an initial-forecasted-arrival-time, initial-forecasted-coordinates, initial-forecasted-elevations, initial-forecasted-headings, initial-forecasted-speeds, an initial-forecasted-flight-duration, initial-forecasted-turbulence, and initial-forecasted-taxi-durations.

A11 The method of any of paragraphs A-A9.1, wherein the initial-forecasted-flight-path includes at least an initial-forecasted-arrival time and optionally one or more of an initial-forecasted-departure-time, initial-forecasted-coordinates, initial-forecasted-elevations, initial-forecasted-headings, initial-forecasted-speeds, an initial-forecasted-flight-duration, initial-forecasted-turbulence, and initial-forecasted-taxi-durations.

A12 The method of any of paragraphs A-A9.1, wherein the initial-forecasted-flight-path includes two or more, three or more, or four or more of an initial-forecasted-departure-time, an initial-forecasted-arrival-time, initial-forecasted-coordinates, initial-forecasted-elevations, initial-forecasted-headings, initial-forecasted-speeds, an initial-forecasted-flight-duration, initial-forecasted-turbulence, and initial-forecasted-taxi-durations.

A13 The method of any of paragraphs A10-A12, wherein the indicia associated with the initial-forecasted-flight-path includes one or more of a map, a forecasted-flight-line on the map, a forecasted-current-location of the unique-flight on the map, the forecasted-arrival-time, the forecasted coordinates, the forecasted elevations, the forecasted headings, the forecasted speeds, the forecasted flight duration, a forecasted length of time remaining, the forecasted taxi durations, and a historical flight line on the map associated with the historical-flight-path-data.

A13.1 The method of paragraph A13, wherein the indicia associated with the initial-forecasted-flight-path further includes information associated with landmarks adjacent the forecasted-flight-line.

A13.1.1 The method of paragraph A13.1, wherein adjacent the forecasted flight line includes regions within at least one of 50, 100, 150, 200, 250, 300, 400, 500, 1000, 0-1000, 50-1000, 100-500, 300-1000, 500-1000, 0-500, 100-500, and 300-500 land miles from the forecasted flight line.

A13.1.2 The method of paragraph A13.1, wherein adjacent the forecasted flight line consists of regions within at least one of 50, 100, 150, 200, 250, 300, 400, 500, 1000, 0-1000, 50-1000, 100-500, 300-1000, 500-1000, 0-500, 100-500, and 300-500 land miles from the forecasted flight line.

A14 The method of any of paragraphs A-A13.1.2, wherein the flight-data-server is associated with the Federal Aviation Administration's Aircraft Situation Display to Industry program, or an equivalent program.

A15 The method of any of paragraphs A-A14, wherein the flight-data-server is a server associated with a provider of software associated with the performance of the method.

A16 The method of any of paragraphs A-A15, wherein the displaying is performed at least after departure of the unique-flight and prior to arrival of the unique-flight.

A17 The method of any of paragraphs A-A16, further comprising:

after departure of the unique-flight and prior to arrival of the unique-flight:

receiving, from a user of the mobile computing device, user-inputted-updated-flight-data associated with the unique-flight, wherein the user-inputted-updated-flight-data includes one or more of an updated departure time, an updated scheduled arrival time, a current location of the unique-flight, an identity of a landmark adjacent to the current location of the unique-flight, an image of a region adjacent to the current location of the unique-flight, and an orientation of the mobile computing device; and forecasting an updated-forecasted-flight-path based at least in part on the initial-forecasted-flight-path and the user-inputted-updated-flight-data, wherein the updatedforecasted-flight-path includes one or more of an updated current location of the unique-flight, an updated forecasted arrival time, updated forecasted coordinates, updated forecasted elevations, updated forecasted headings, updated forecasted speeds, an updated forecasted flight duration; and an updated forecasted length of time remaining; and displaying on the display of the mobile computing device indicia associated with the updated-forecasted-flight-path.

A18 The method of any of paragraphs A-A16, further comprising:

after departure of the unique-flight and prior to arrival of the unique-flight:

receiving, from a user of the mobile computing device, an identity of a landmark adjacent to a current location of the unique-flight; and forecasting an updated-forecasted-flight-path based at least in part on the initial-forecasted-flight-path and the identity of the landmark, wherein the updated-forecasted-flight-path includes one or more of an updated current location of the unique-flight, an updated forecasted arrival time, updated forecasted coordinates, updated forecasted elevations, updated forecasted headings, updated forecasted speeds, and an updated forecasted flight duration; and displaying indicia associated with the updated-forecasted-flight-path.

A19 The method of any of paragraphs A-A18, wherein the mobile computing device includes a camera, the method further comprising:

after departure of the unique-flight and prior to arrival of the unique-flight:

receiving an image of a land feature via the camera;

displaying on the display of the mobile computing device the image and a map;

receiving user input to associate the image with the map;

forecasting an updated-forecasted-flight-path based at least in part on the initial-forecasted-flight-path and the image, wherein the updated-forecasted-flight-path includes one or more of an updated current location of the unique-flight, an updated forecasted arrival time, updated forecasted coordinates, updated forecasted elevations, updated forecasted headings, updated forecasted speeds, and an updated forecasted flight duration; and displaying on the display of the mobile computing device indicia associated with the updated-forecasted-flight-path.

A20 The method of any of paragraphs A-A19, wherein the mobile computing device includes a compass, the method further comprising:

after departure of the unique-flight and prior to arrival of the unique-flight:

detecting with the compass an orientation of the mobile computing device;

receiving user input to associate the orientation of the mobile computing device with the forecasted-flight-path; and forecasting an updated-forecasted-flight-path based at least in part on the initial-forecasted-flight-path and the orientation of the mobile computing device, wherein the updated-forecasted-flight-path includes one or more of an updated current location of the unique-flight, an updated forecasted arrival time, updated forecasted coordinates, updated forecasted elevations, updated forecasted headings, updated forecasted speeds, and an updated forecasted flight duration; and displaying on the display of the mobile computing device indicia associated with the updated-forecasted-flight-path.

A21 The method of any of paragraphs A-A9.1, wherein the mobile computing device includes a camera, the method further comprising:

after departure of the unique-flight and prior to arrival of the unique-flight:

receiving an image via the camera; and in response to user input, associating the image with a flight profile associated with the unique-flight.

A21.1 The method of paragraph A21, further comprising:

after the associating, displaying on the display of the mobile computing device a map with a flight line associated with the unique-flight, the map including indicia associated with the image.

A21.1.1 The method of paragraph A21.1, further comprising;

after the displaying the map, displaying on the display of the mobile computing device the image in response to user input.

A22 The method of any of paragraphs A17-A21.1.1, wherein one or more of the steps performed after departure of the unique-flight and prior to arrival of the unique-flight are performed without the mobile computing device having access to the Internet.

A23 The method of any of paragraphs A17-A21.1.1, wherein the steps performed after departure of the unique-flight and prior to arrival of the unique-flight are performed without the mobile computing device having access to the Internet.

A24 The method of any of paragraphs A17-A23, wherein one or more of the steps performed after departure of the unique-flight and prior to arrival of the unique-flight are performed without the mobile computing device having access to a global positioning system (GPS).

A25 The method of any of paragraphs A17-A23, wherein the steps performed after departure of the unique-flight and prior to arrival of the unique-flight are performed without the mobile computing device having access to a global positioning system (GPS).

A26 The method of any of paragraphs A-A25, further comprising:

after departure of the unique-flight and prior to arrival of the unique-flight:

establishing a connection to the Internet;

retrieving from a flight location server via the Internet recent location data associated with the unique-flight, wherein the recent location data includes one or more of data associated with coordinates, elevations, headings, speeds, and times of the unique-flight; and forecasting an updated-forecasted-flight-path based at least in part on the initial-forecasted-flight-path and the recent location data, wherein the updated-forecasted-flight-path includes one or more of an updated current location of the unique-flight, an updated forecasted arrival time, updated forecasted coordinates, updated forecasted elevations, updated forecasted headings, updated forecasted speeds, and an updated forecasted flight duration; and displaying on the display of the mobile computing device indicia associated with the updated-forecasted-flight-path.

A27 The method of any of paragraphs A-A26, wherein the mobile computing device includes global position system (GPS) capabilities, the method further comprising:

after departure of the unique-flight and prior to arrival of the unique-flight:

receiving from one or more GPS satellites location data associated with the current location of the mobile computing device; and forecasting an updated-forecasted-flight-path based at least in part on the current location of the mobile computing device, wherein the updated-forecasted-flight-path includes one or more of an updated current location of the unique-flight, an updated forecasted arrival time, updated forecasted coordinates, updated forecasted elevations, updated forecasted headings, updated forecasted speeds, and an updated forecasted flight duration; and displaying on the display of the mobile computing device indicia associated with the updated-forecasted-flight-path.

A28 The method of any of paragraphs A17-A27, wherein the indicia associated with the updated-forecasted-flight-path includes one or more of a map, an updated forecasted flight line on the map, an updated forecasted current location of the unique-flight on the map, the updated forecasted arrival time, the updated forecasted coordinates, the updated forecasted elevations, the updated forecasted headings, the updated forecasted speeds, the updated forecasted flight duration, and the updated forecasted length of time remaining.

A29 The method of any of paragraphs A16-A28, wherein one or more of the receiving, the forecasting, and the displaying steps performed after departure of the unique-flight and prior to arrival of the unique-flight are repeated.

A30 The method of any of paragraphs A-A12.1, further comprising:

after departure of the unique-flight and prior to arrival of the unique-flight, alerting the user of forecasted turbulence.

A31 The method of any of paragraphs A-A30, further comprising:

prior to departure of the unique-flight, retrieving from a landmark data server via the Internet landmark data associated with one or more landmarks adjacent to a flight line corresponding to the initial-forecasted-flight-path.

A31.1 The method of paragraph A31, wherein adjacent to the flight line includes regions within at least one of 50, 100, 150, 200, 250, 300, 400, 500, 1000, 0-1000, 50-1000, 100-500, 300-1000, 500-1000, 0-500, 100-500, and 300-500 land miles from the flight line.

A31.2 The method of any of paragraphs A31-A31.1, further comprising:

after departure of the unique-flight and prior to arrival of the unique-flight, displaying on the display of the mobile computing device a map with a flight line associated with the unique-flight, the map including indicia associated with the one or more landmarks.

A31.2.1 The method of paragraph A31.2, further comprising:

after the displaying the map with the flight line associated with the unique-flight:

receiving user input to select one of the one or more landmarks; and displaying on the display of the mobile computing device data associated with the selected one of the one or more landmarks.

A31.2.2 The method of any of paragraphs A31.2-A31.2.1, further comprising:

after displaying the map with the flight line associated with the unique-flight:

displaying indicia that queries a user for an identity of one of the one or more landmarks;

receiving from the user an input associated with the identity;

comparing the input to the identity; and displaying on the display of the mobile computing device indicia based on the comparing.

A31.3 The method of any of paragraphs A31-A31.2.2, further comprising:

providing a game for the user to play, wherein the game includes displaying indicia that queries the user to identify the one or more landmarks and rewarding the user for correctly identifying the one or more landmarks.

A31.4 The method of any of paragraphs A31-A31.3, further comprising:

prior to departure of the unique-flight, displaying on the display of the mobile computing device indicia associated with a comparison of the flight path of the unique-flight and locations of the one or more landmarks adjacent the flight path of the unique-flight.

A32 The method of any of paragraphs A-A31.4, further comprising:

after arrival of the unique-flight, displaying on the display of the mobile computing device a flight summary associated with the unique-flight, wherein the flight summary includes one or more of a flight line on a map, an original forecasted departure time, an updated forecasted departure time, an actual departure time, an original forecasted arrival time, an updated forecasted arrival time, an actual arrival time, an original forecasted flight duration, an updated forecasted flight duration, an actual flight duration, data associated with user input received during the unique-flight, and images received by the mobile computing device during the unique-flight.

A33 The method of any of paragraphs A-A32, further comprising:

after arrival of the unique-flight:

receiving user input to send data associated with the unique-flight, wherein the data associated with the unique-flight includes one or more of a notification of arrival, a flight line on a map, an original forecasted departure time, an updated forecasted departure time, an actual departure time, an original forecasted arrival time, an updated forecasted arrival time, an actual arrival time, an original forecasted flight duration, an updated forecasted flight duration, an actual flight duration, data associated with user input received during the unique-flight, and images received by the mobile computing device during the unique-flight; and sending via the Internet the data associated with the unique-flight to one or more of a social networking site, a server associated with the method, an email address, a web site, and a short message service (SMS) address.

A34 The method of any of paragraphs A-A33, further comprising:

prior to departure of the unique-flight, retrieving from a map server via the Internet map data associated with regions adjacent to a flight line corresponding to the initial-forecasted-flight-path;

wherein the displaying indicia associated with the initial-forecasted-flight-path includes displaying on the display of the mobile computing device the map data.

A34.1 The method of paragraph A34, wherein adjacent to the flight line includes regions within at least one of 50, 100, 150, 200, 250, 300, 400, 500, 1000, 0-1000, 50-1000, 100-500, 300-1000, 500-1000, 0-500, 100-500, and 300-500 land miles from the flight line.

A34.2 The method of paragraph A34, wherein adjacent to the flight line consists of regions within at least one of 50, 100, 150, 200, 250, 300, 400, 500, 1000, 0-1000, 50-1000, 100-500, 300-1000, 500-1000, 0-500, 100-500, and 300-500 land miles from the flight line.

A35 The method of any of paragraphs A-A34.2, wherein the forecasting includes weighted means averaging.

B Computer readable storage media including computer-executable instructions that, when executed, direct a mobile computing device to perform the method of any of paragraphs A-A35.

C A mobile computing device, comprising:
a memory device including computer-executable instructions that, when executed, direct a mobile computing device to perform the method of any of paragraphs A-A35;
a display configured to display indicia; and
a user input mechanism configured to receive user inputs.

D A system for forecasting a flight-path of a unique-flight from an origin to a destination, the system comprising:
the mobile computing device of paragraph C; and
the flight-data-server.

E A computer implemented method for forecasting a flight-path of a unique-flight from an origin to a destination, the method comprising:
receiving unique-flight-data associated with the unique-flight and identifying the unique-flight;
forecasting a forecasted-flight-path for the unique-flight based on flight-path-data associated with the unique-flight.

E1 The method of paragraph E, further comprising:
sending the forecasted-flight-path to a mobile computing device.

E2 The method of any of paragraphs E-E1, wherein the flight-path-data includes historical-flight-path-data, wherein the historical-flight-path-data relates to previous instances of flights from the origin to the destination, wherein the historical-flight-path-data includes one or more of data associated with coordinates, elevations, headings, speeds, flight durations, locations of turbulence, and taxi durations of the previous instances of flights.

E3 The method of any of paragraphs E-E2, wherein the flight-path-data includes a flight-plan, wherein the flight-plan includes one or more of departure procedures, planned coordinates, planned way-points, arrival procedures, planned elevations, planned headings, planned speeds, planned flight duration, and planned taxi durations for the unique-flight.

E4 The method of any of paragraphs E-E3, wherein the method is a server implemented method.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application. Such new claims, whether they are directed to a different invention or directed to the same invention, whether different, broader, narrower, or equal in scope to the original claims, are also regarded as included within the subject matter of the present disclosure.

INDUSTRIAL APPLICABILITY

The present disclosure is applicable to at least the mobile computing device, software, and travel industries.

The invention claimed is:

1. A mobile computing device implemented method for creating an interactive experience for a non-flight-crew traveler of a unique-flight from an origin to a destination, the method comprising:
prior to departure of the unique-flight, requesting and receiving, by the mobile computing device, from the non-flight-crew traveler unique-flight-data that identifies the unique-flight;
prior to departure of the unique-flight, retrieving, by the mobile computing device, from a flight-data-server via the Internet an initial flight-path for the unique-flight; and
after departure of the unique-flight and prior to arrival of the unique-flight:
requesting and receiving, by the mobile computing device, from the non-flight-crew traveler an actual departure time;
calibrating, by the mobile computing device, an updated flight-path based on the initial flight-path and the actual departure time received from the non-flight-crew traveler, wherein the updated flight-path is a function of a location of the unique-flight and time;
predicting, by the mobile computing device, a predicted current location of the unique-flight based at least in part on the actual departure time received from the non-flight-crew traveler; and
displaying, by the mobile computing device, to the non-flight-crew traveler on a display of the mobile computing device indicia associated with the updated flight-path, wherein the indicia includes a map, a flight line on the map, and the predicted current location of the unique-flight on the map.

2. The method of claim 1, wherein the calibrating, the predicting, and the displaying are performed with the mobile computing device in its airplane mode with wireless communication disabled, without access to the Internet, and without access to a global positioning system.

3. The method of claim 1, further comprising:
after departure of the unique-flight and prior to arrival of the unique-flight and with the mobile computing device in its airplane mode with wireless communication disabled, without access to the Internet, and without access to a global positioning system:
receiving, by the mobile computing device, from the non-flight-crew traveler an approximate current location of the unique-flight;
wherein the predicting is further based at least in part on the approximate current location of the unique-flight received from the non-flight-crew traveler.

4. The method of claim 1, further comprising:
prior to departure of the unique-flight, retrieving, by the mobile computing device, from a landmark data server landmark data associated with one or more landmarks adjacent to the flight line; and after departure of the unique-flight and prior to arrival of the unique-flight:
- displaying, by the mobile computing device, to the non-flight-crew traveler on the display of the mobile computing device indicia associated with the one or more landmarks;
- receiving, by the mobile computing device, input from the non-flight-crew traveler to select one of the one or more landmarks; and
- displaying, by the mobile computing device, to the non-flight-crew traveler on the display of the mobile computing device data associated with the selected one of the one or more landmarks.

5. A mobile computing device implemented method for creating an interactive experience for a non-flight-crew traveler of a unique-flight from an origin to a destination, the method comprising:
- prior to departure of the unique-flight, requesting and receiving, by the mobile computing device, from the non-flight-crew traveler unique-flight-data that identifies the unique-flight;
- prior to departure of the unique-flight, retrieving, by the mobile computing device, from a flight-data-server via the Internet an initial flight-path for the unique-flight; and
- after departure of the unique-flight and prior to arrival of the unique-flight and with the mobile computing device in its airplane mode with communication disabled, without access to the Internet, and without access to a global positioning system:
  - displaying, by the mobile computing device, to the non-flight-crew traveler on a display of the mobile computing device indicia including a map, a flight line on the map, and a predicted current location of the unique-flight on the map;
  - receiving, by the mobile computing device, from the non-flight-crew traveler an approximate current location of the unique-flight;
  - calibrating, by the mobile computing device, an updated flight-path based on the initial flight-path and the approximate current location of the unique-flight received from the non-flight-crew traveler, wherein the updated flight-path is a function of a location of the unique-flight and time;
  - predicting, by the mobile computing device, a predicted length of time remaining for the unique-flight based at least in part on the approximate current location of the unique-flight received from the non-flight-crew traveler; and
  - displaying, by the mobile computing device, to the non-flight-crew traveler on the display of the mobile computing device indicia including the map, the flight line on the map, and an updated predicted current location of the unique-flight on the map.

6. The method of claim 5, further comprising:
after departure of the unique-flight and prior to arrival of the unique-flight and with the mobile computing device in its airplane mode with communication disabled, without access to the Internet, and without access to a global positioning system:
- predicting, by the mobile computing device, the predicted current location of the unique-flight based at least in part on the approximate current location of the unique-flight received from the non-flight-crew traveler.

7. The method of claim 5, further comprising:
prior to departure of the unique-flight, retrieving, by the mobile computing device, from a landmark data server landmark data associated with one or more landmarks adjacent to the flight line; and after departure of the unique-flight and prior to arrival of the unique-flight:
- displaying, by the mobile computing device, to the non-flight-crew traveler on the display of the mobile computing device indicia associated with the one or more landmarks;
- receiving, by the mobile computing device, input from the non-flight-crew traveler to select one of the one or more landmarks; and
- displaying, by the mobile computing device, to the non-flight-crew traveler on the display of the mobile computing device data associated with the selected one of the one or more landmarks.

8. The method of claim 1, wherein the mobile computing device includes a camera, the method further comprising:
after departure of the unique-flight and prior to arrival of the unique-flight:
- receiving, by the mobile computing device, an image of a land feature via the camera;
- displaying, by the mobile computing device, to the non-flight-crew traveler on the display of the mobile computing device the image and the map; and
- receiving, by the mobile computing device, user input from the non-flight-crew traveler to associate the image with the map;
wherein the predicting includes predicting, by the mobile computing device, the predicted current location of the unique-flight based at least in part on the image.

9. The method of claim 1, wherein the mobile computing device includes a compass, the method further comprising:
after departure of the unique-flight and prior to arrival of the unique-flight:
- detecting with the compass an orientation of the mobile computing device; and
- receiving, by the mobile computing device, user input from the non-flight-crew traveler to associate the orientation of the mobile computing device with the updated flight-path;
wherein the predicting includes predicting, by the mobile computing device, the predicted current location of the unique-flight based at least in part on the orientation.

10. The method of claim 1, wherein the mobile computing device includes a camera, the method further comprising:
after departure of the unique-flight and prior to arrival of the unique-flight:
- receiving, by the mobile computing device, an image via the camera;
- associating, by the mobile computing device, the image with a flight profile associated with the unique-flight responsive to user input from the non-flight-crew traveler.

11. The method of claim 1, wherein the mobile computing device includes global positon system (GPS) capabilities, the method further comprising:
after departure of the unique-flight and prior to arrival of the unique-flight, receiving, by the mobile computing device, from one or more GPS satellites location data associated with the mobile computing device;
wherein the predicting includes predicting, by the mobile computing device, the predicted current location of the unique-flight based at least in part on the location data.

12. The method of claim 1, further comprising:
after departure of the unique-flight and prior to arrival of the unique-flight, alerting, by the mobile computing device, the non-flight-crew traveler of forecasted turbulence.

13. The method of claim 4, further comprising:
providing, by the mobile computing device, a game for the non-flight-crew traveler to play, wherein the game includes displaying indicia on the display of the mobile computing device that queries the non-flight-crew traveler to identify the one or more landmarks and rewarding the non-flight-crew traveler for correctly identifying the one or more landmarks.

14. The method of claim 5, wherein the mobile computing device includes a camera, the method further comprising:
after departure of the unique-flight and prior to arrival of the unique-flight:
receiving, by the mobile computing device, an image of a land feature via the camera;
displaying, by the mobile computing device, to the non-flight-crew traveler on the display of the mobile computing device the image and the map; and
receiving, by the mobile computing device, user input from the non-flight-crew traveler to associate the image with the map;
wherein the predicting includes predicting, by the mobile computing device, the predicted current location of the unique-flight based at least in part on the image.

15. The method of claim 5, wherein the mobile computing device includes a compass, the method further comprising:
after departure of the unique-flight and prior to arrival of the unique-flight:
detecting with the compass an orientation of the mobile computing device; and
receiving, by the mobile computing device, user input from the non-flight-crew traveler to associate the orientation of the mobile computing device with the updated flight-path;
wherein the predicting includes predicting, by the mobile computing device, the predicted current location of the unique-flight based at least in part on the orientation.

16. The method of claim 5, wherein the mobile computing device includes a camera, the method further comprising:
after departure of the unique-flight and prior to arrival of the unique-flight:
receiving, by the mobile computing device, an image via the camera;
associating, by the mobile computing device, the image with a flight profile associated with the unique-flight responsive to user input from user input from the non-flight-crew traveler.

17. The method of claim 5, wherein the mobile computing device includes global positon system (GPS) capabilities, the method further comprising:
after departure of the unique-flight and prior to arrival of the unique-flight, receiving, by the mobile computing device, from one or more GPS satellites location data associated with the mobile computing device;
wherein the predicting includes predicting, by the mobile computing device, the predicted current location of the unique-flight based at least in part on the location data.

18. The method of claim 5, further comprising:
after departure of the unique-flight and prior to arrival of the unique-flight, alerting, by the mobile computing device, the non-flight-crew traveler of forecasted turbulence.

19. The method of claim 7, further comprising:
providing, by the mobile computing device, a game for the non-flight-crew traveler to play, wherein the game includes displaying indicia on the display of the mobile computing device that queries the non-flight-crew traveler to identify the one or more landmarks and rewarding the non-flight-crew traveler for correctly identifying the one or more landmarks.

\* \* \* \* \*